March 28, 1961  C. R. JOHNSTON  2,976,824
FREIGHT LOADING APPARATUSES
Filed Aug. 3, 1959  3 Sheets-Sheet 1

INVENTOR.
CHARLES RICHARD JOHNSTON
BY Threedy & Threedy
HIS ATTORNEYS.

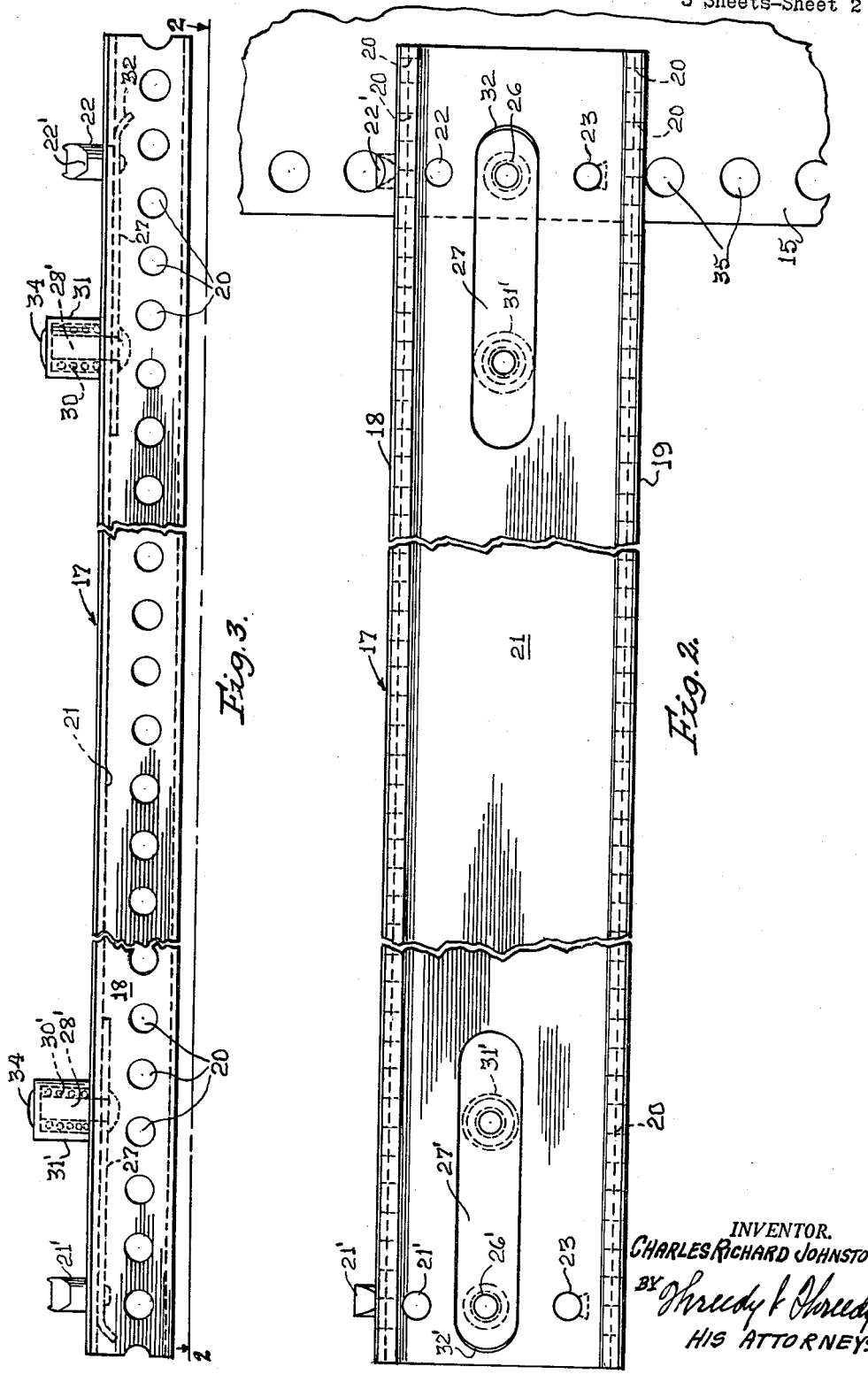

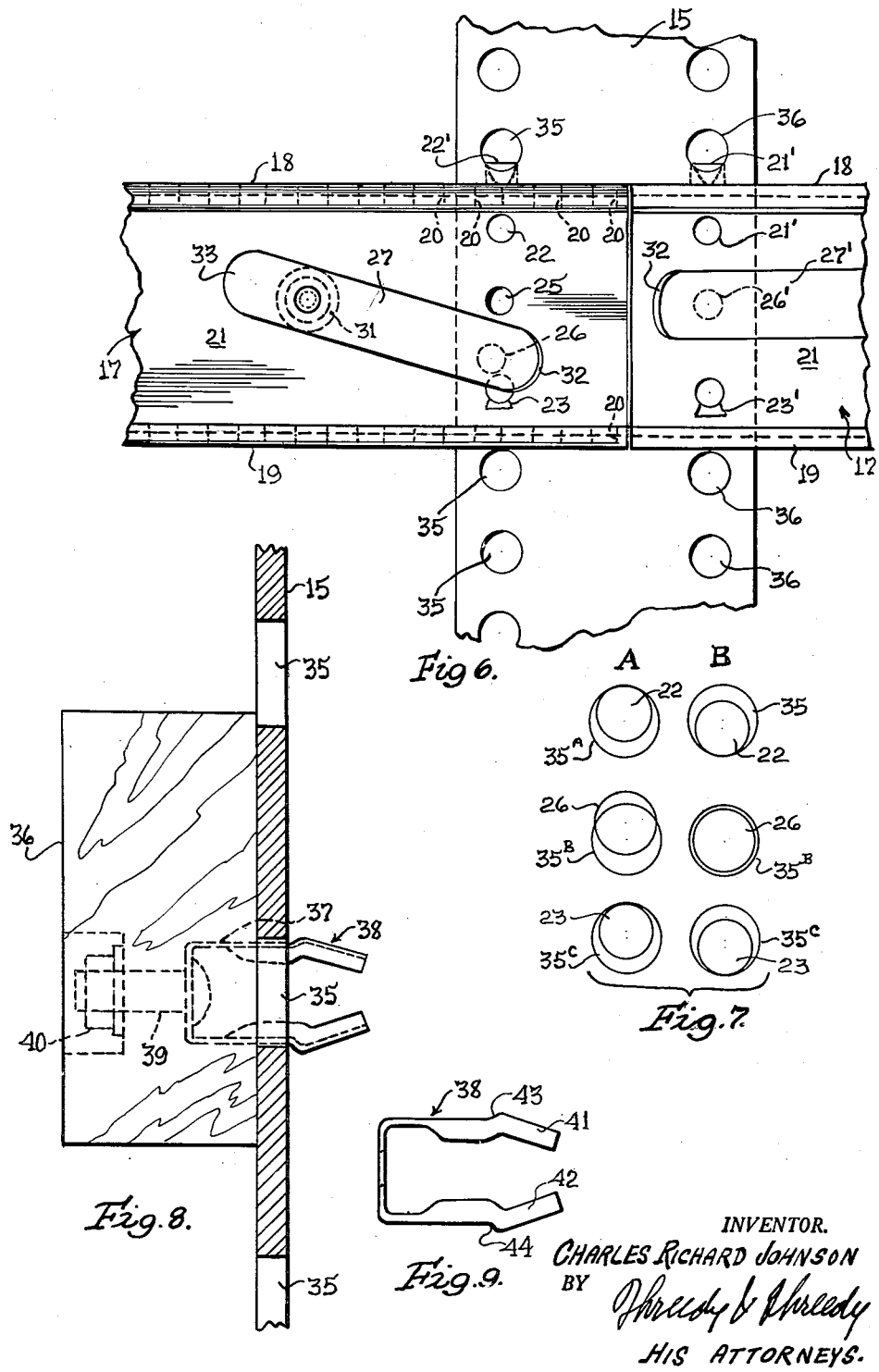

United States Patent Office 2,976,824
Patented Mar. 28, 1961

2,976,824

FREIGHT LOADING APPARATUSES

Charles Richard Johnston, Chicago, Ill., assignor to Transportation Specialties Co., Chicago, Ill., a corporation of Illinois Filed Aug. 3, 1959, Ser. No. 831,200

10 Claims. (Cl. 105—369)

My invention relates to a new and useful improvement in freight loading apparatuses and more particularly to equipment of this character which is placed within a vehicle such as a railroad car or the like to cooperate with other equipment for the loading and placement of a wide variety of articles of various sizes for shipment therein.

Another object of my invention is in the provision in an apparatus for this character of an adjustable freight supporting rail member for a freight retaining crossbar.

A further object of my invention is in the provision in an apparatus of this character of a releasable locking means for removably connecting a supporting rail member to the interior side walls of a freight loading vehicle.

Yet another object of my invention is in the provision in an apparatus of this character of a resiliently urged locking pin for connecting a rail supporting member to certain portions of the interior side walls of a freight hauling vehicle.

Another important object of my invention is in the provision in an apparatus of this character of a hinged-type mounting for a locking pin for cooperating with stationary members carried by a rail supporting member for releasably connecting the rail supporting member in selected position within a freight hauling vehicle.

A still further object of my invention is in the provision of an apparatus of this character of stationary positioning members cooperating with a movable locking pin for detachably connecting a rail supporting member for a freight retaining crossbar within a freight loading vehicle.

An equally important object of my invention is in the provision in an apparatus of this character of a means for removably positioning a rub rail for cooperation with my adjustable rail supporting member.

Other objects will appear hereinafter.

The invention consists in the novel combination and arrangement of parts to be hereinafter described and claimed.

The invention will be best understood by reference to the accompanying drawings showing the preferred form of construction and in which:

Fig. 2 is a fragmentary side elevational view of my adjustable rail supporting member;

Fig. 3 is a fragmentary top plan view of my rail supporting member;

Fig. 6 is a fragmentary side elevational view similar to Fig. 2 but showing certain parts thereof in adjusted position;

Fig. 7 is a schematic diagram showing the relationship of certain parts of my invention in certain attaching positions;

Fig. 8 is a fragmentary end view of a wood rub rail as associated with my rail supporting member; and Fig. 9 is a side elevational view of the spring clip means employed in detachably connecting the wood rub rail in selected position with respect to certain structural parts of the vehicle.

My invention relates to a freight loading apparatus particularly wherein there is employed a freight retaining crossbar which is adapted to be selectively positioned with respect to the side walls of the freight hauling vehicle for positioning and retaining freight therein. Such freight retaining crossbar is adapted to be releasably connected at each end to a supporting member. Such supporting member is referred to as a rail supporting member and it has been heretofore the practice to fixedly attach the same in a predetermined position onto certain structural elements of the vehicle. The primary object of my invention is to provide a means whereby such rail supporting member may be detachably connected and selectively positioned within the vehicle.

Figure 1:
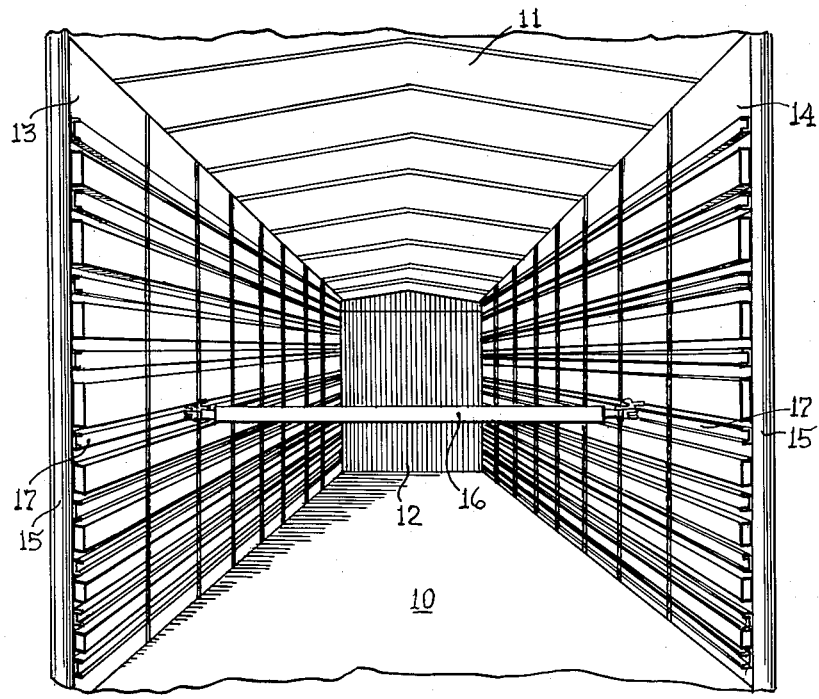
Fig. 1 is a fragmentary perspective view of the interior of a freight hauling vehicle equipped with my invention.

Referring to Fig. 1 I show the interior of a freight hauling vehicle equipped with my detachable freight loading apparatus. The vehicle includes a floor 10, a top wall 11, end walls 12 and side walls 13 and 14. These side walls 13 and 14 are vertically supported by structural support posts 15 extending throughout the length of the vehicle at set predetermined intervals.

These structural support posts 15 are usually Z-shaped and therefore present a vertically extending flange which extends in spaced parallel relation to the side wall of the vehicle.

A suitable freight retaining crossbar 16 is adapted to extend between rail supporting members 17 carried by such structural support posts 15. The freight retaining crossbar and its means for attaching either end thereof to horizontally aligned rail supporting members carried by each of the side walls is of the construction shown, described and claimed in my United States Letters Patent No. 2,896,554.

Figures 4, 5:
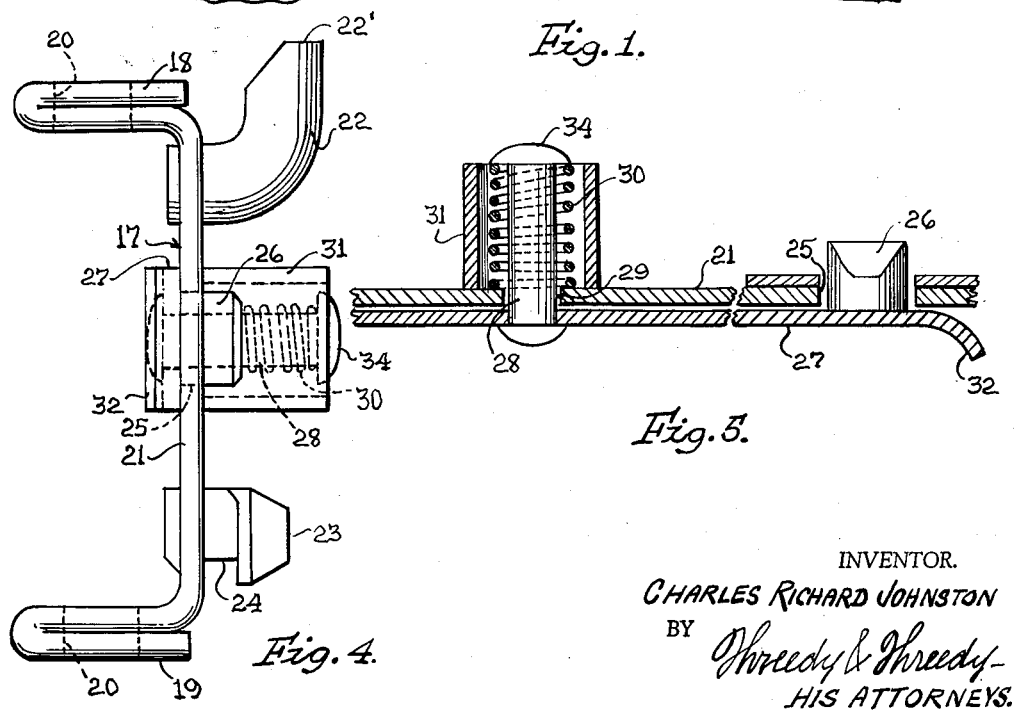
Fig. 4 is a side elevational view of the same showing in dotted lines certain structural parts thereof.
Fig. 5 is a fragmentary detailed sectional view of the removable locking pin arrangement of my invention.

My detachable rail supporting member 17 consists of a single piece of metal having the ends thereof formed to provide spaced apart parallelly extending lateral flanges 18 and 19. In such form my rail supporting member 17 is substantially U-shaped in cross section as seen in Fig. 4. In each of the laterally extending flanges 18 and 19, I provide a series of vertically aligned apertures 20. These apertures 20 extend throughout the horizontal length of each of the flanges 18 and 19. The rail supporting members 17 are of a length substantially equal to the intervals between the centerline of each of the structural supporting posts 15 of the vehicle. Adjacent either end of the rail supporting members 17 and extending rearwardly from the bight portion 21 thereof and in close proximity to the flange 18 is a hook 22. This hook 22 has its free end 22' terminating in a spaced vertical relation to the flange 18. Adjacent the flange 19 and extending rearwardly from the bight portion 21 and in vertical alignment with respect to the hook 22 is a latch pin 23. This latch pin 23 has on its lower face a notched-out portion which provides a recessed shoulder 24. It is noted that the recessed shoulder 24 faces in an opposite direction with respect to the free end 22' of the hook 22 as clearly seen in Fig. 4. The purpose and function of the recessed shoulder 24 as well as the structural arrangement between the hook 22 and the latch pin 23 will be hereinafter described.

Formed in the bight portion 21 in vertical alignment and equally spaced between the hook 22 and the latch pin 23 is a circular aperture 25. Adapted to project through this aperture 25 in a rearwardly direction with respect to the bight portion 21 and in spaced relation to the hook 22 and latch pin 23 is a movable locking pin 26. This locking pin 26 is carried by one end of a latch lever 27. The latch lever 27 has its long axis extending in a parallel direction with respect to the longitudinal axis of the supporting member 17 and in facial abutment with the bight portion 21 thereof between the flanges 18 and 19. This latch lever 27 is provided with a novel means of connection to the supporting member 17. This novel connection permits a composite pivotal and rotatable movement of such latch lever 27 and its locking pin 26 with respect to the bight portion 21 of the supporting member 17 in a manner and for a purpose hereinafter made apparent.

The novel means of connecting the latch lever 27 to the supporting member 17 consists of a double-headed rivet pin 28 fiixedly carried by and extending laterally from one end of the latch lever 27. This rivet pin 28 extends in a spaced parallel direction with respect to the locking pin 26. This rivet pin 28 is adapted to freely pass through an aperture 29 formed in the bight portion 21. Adapted to be coiled about that portion of the rivet pin 28 which extends rearwardly of the bight portion 21 is a spring 30. The spring 30 as well as the rivet pin 28 is contained in a circular bushing 31 fixedly connected to the rear wall of the bight portion 21 of the supporting member 17 as shown in Figs. 4 and 5. The latch lever 27 adjacent the end thereof that carries the locking pin 26 is bent laterally so as to form a fingerpiece 32. By this structural arrangement I have provided a novel yieldable connection between the latching lever 27 and the supporting member 17 where by manipulation of the latch lever 27 the locking pin 26 may be readily withdrawn from the aperture 25.

When the fingerpiece 32 is pulled laterally away from the bight portion 21 the opposite end 33 of the latch lever 27 will bear against the bight portion 21 and at such point act as a pivot for the lever 27. Such pivotal movement of the latch lever 27 is against the action of the spring 30 and such movement will draw the rivet head 34 and the spring 30 into the bushing 31.

When the latch lever 27 is thus pivoted to a degree that the locking pin 26 is completely withdrawn from the aperture 25 it can be rotated about the connection to the supporting member 17 to a position where the locking pin 26 will be out of alignment with respect to the aperture 25 and will rest on the face of the bight portion 21 as seen in Fig. 6.

Referring to Figs. 2 and 3 it is seen that the lefthand end of the supporting member 17 is provided with identical parts. Such lefthand end has a latch lever 27', a hook 21', a locking pin 26', a bushing 31', a voil spring 30' within such bushing and a rivet pin 28'. The function and operation of each of the parts are identical and in this respect I will describe but one connecting operation.

The structural supporting posts 15 of the vehicle are provided with two rows of vertically aligned equally spaced openings 35 and 36. In connecting the rail supporting members 17 the hook 22, the latch pin 23 and the locking pin 26 are received in three vertically aligned successive openings of the row of openings 35 or 36.

The operator will take the rail supporting member 17 and at the selected horizontal level causes the free end 21' of the hook 22 to be inserted into one of the openings 35. In order to do so the rail supporting member 17 must be held at a slight angle with respect to the vertical face of the structural supporting posts 15. As the hook 22 is inserted into its selected opening, the member 17 is swung into facial abutment with the post 15 so that the latch pin 23 will enter into the third spaced opening formed in such post. At this point of connection between the member 17 and the post 15 the aperture 25 formed in the bight portion 21 of the member 17 will be out of alignment with respect to the middle opening of the third successive openings herewith concerned. Thus, if the locking pin 26 is protruding through the aperture 25 it will not pass into the middle opening formed in the supporting post 15. When the hook 22 as well as the latch pin 23 are inserted into their respective openings 35 the supporting member 17 is pushed in a downward direction so that a portion of the post 15 will pass into engagement with the recessed shoulder 24 of the latch pin 23. Such downward movement of the supporting member 17 aligns the aperture 25 with the middle opening in the post 15. Upon such alignment the locking pin 26 will pass into the middle opening of the post 15 and the supporting member 17 will be in latched position.

To further illustrate the method of insertion of the hook 22, the latch pin 23 and the locking pin 26, I direct your attention to Fig. 7. In column A of Fig. 7 I schematically show the hook 22 in its selected opening 35a. Also in column A it is seen that latch pin 23 is in its selected opening 35c. The hook 22 and the latch pin 23 are positioned in the uppermost portion of their respective openings 35a and 35c. In such position the locking pin 26 is out of alignment with its opening 35b. Referring to column B of Fig. 7 it is seen that when the hook 22 and the latch pin 23 are moved downwardly into the lowermost confines of their respective openings 35a and 35c, the locking pin 26 will be simultaneously moved into alignment with its opening 35b.

In the latched position as hereinbefore described the hook 22 cooperates with the latch pin 23 and the locking pin 26 to attach the supporting member 17 to the structural supporting post 15 in such a manner that there can be no movement of the supporting member 17 from such latched position.

To remove the supporting member 17 the latch lever 27 must be pivoted away from the bight portion 21 until the locking pin 26 is withdrawn from its opening formed in the supporting post 15 and from the aperture 25 formed in the bight portion 21 and then rotated to a position shown in Fig. 6. When the latch lever 27 together with the locking pin 26 is in the position shown in Fig. 6 the supporting member 17 is pushed upwardly until the post 15 is disengaged from the shoulder 24. The latch pin 23 is withdrawn and then the hook 22 is withdrawn.

Referring to Fig. 6 it is seen how two supporting members 17 are connected to a supporting post 15 in a manner that the flanges 18 and 19 thereof present an uninterrupted rail-like member throughout the horizontal length of the vehicle.

In freight loading apparatuses of this character it is desirous of attaching to the supporting posts 15 a filler block 36. This filler block 36 is adapted to be positioned between horizontally extending supporting member 17 as seen in Fig. 1. These filler blocks 36 extend inwardly of the side walls of the vehicle to a point slightly beyond the innermost projection of the flanges 18 and 19 of the supporting member 17.

As the supporting members 17 are adjustably positioned it therefore necessitates a filler block which is likewise adjustably positioned within the vehicle. Referring to Fig. 8 I show a filler block 36 which is provided with a recess 37 formed in one face thereof. Positioned within the recess 37 is a spring clip 38. This spring clip 38 is connected to the filler block in the recess 37 by means of a bolt 39 and a nut 40. It is seen that the nut 40 is recessed with respect to the exposed face of the filler block 36 so as to prevent damage to any freight that might be placed in contact therewith. The clip 38 provides two spaced apart spring fingers 41 and 42. These fingers 41 and 42 have their free ends bent in the direction so as to converge toward each other. The fingers 41 and 42 each provide a shoulder 43 and 44 respectively which are adapted to be disposed behind the supporting post 15 after the fingers 41 and 42 have been projected through an opening 35 formed therein. Thus it is readily seen that the filler block 36 by its spring clip 38 may be adjustably positioned and connected to the supporting posts 15 of the vehicle in desired relationship with respect to the adjustable rail supporting members 17.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a rail-like freight supporting member for use in a freight car having a freight holding system including freight retaining cross bars, means for detachably connecting said rail-like supporting member horizontally with respect to vertically extending structural members of the freight car, said means including a plurality of pins extending laterally from said rail-like supporting members, with said pins being insertable into a selected plurality of apertures formed in the vertical faces of the structural members of the freight car, means for yieldably connecting one of said pins to said rail-like supporting member so that it may be moved out of and into a selected one of the plurality of apertures formed in the structural members so as to detachably connect said rail-like supporting members horizontally to the structural members throughout the freight car.

2. In a rail-like freight supporting member for use in a freight car having a freight holding system including freight retaining cross bars, means for detachably connecting said rail-like supporting member horizontally with respect to vertically extending structural members of the freight car, said means including a plurality of pins extending laterally from said rail-like supporting member with said pins being insertable into a selected plurality of apertures formed in the vertical faces of the structural members of the freight car, two of said pins being fixedly carried by said supporting member, the other of the pins being movable with respect to a yieldable connection to said supporting member, means providing a yieldable connection between said movable pin and said supporting member whereby said pin may be moved between a retracted position and a locking position with respect to the structural members for detachably connecting said rail-like supporting member thereto.

3. In a rail-like freight supporting member for use in a freight car having a freight holding system including freight retaining cross bars, means for detachably connecting said rail-like supporting member horizontally with respect to vertically extending structural members of the freight car, said means including a plurality of pins extending laterally from said rail-like supporting member, with said pins being insertable into a selected plurality of apertures formed in the vertical faces of the structural members of the freight car, a latch lever pivotally and rotatably carried by said rail-like member, locking means carried at one end of said lever and being projectable through an opening formed in said rail-like member for insertion into a selected aperture formed in the structural members and adapted to cooperate with said pins to detachably connect said rail-like member to the structural members, means for pivotally and rotatably connecting said lever to said rail-like member for permitting said locking means carried by said lever to be withdrawn from said aperture and rotated about a horizontal axis with respect to said rail-like member so that said rail-like member may be detached from the structural members.

4. In a rail-like freight supporting member for use in a freight car having a freight holding system including freight retaining cross bars, means for detachably connecting said rail-like supporting member horizontally with respect to vertically extending structural members of the freight car, said means including a plurality of pins extending laterally from said rail-like supporting member, with said pins being insertable into a selected plurality of apertures formed in the vertical faces of the structural members of the freight car, a latch lever pivotally and rotatably carried by said rail-like member and having an operative and inoperative position for latching said rail-like member to the structural members of the freight car, a locking pin carried at one end of said lever and being projectable through an opening formed in said rail-like member for insertion into a selected aperture formed in the structural members and adapted to cooperate with said pins to detachably connect said rail-like member to the structural members, means for pivotally and rotatably connecting said lever to said rail-like member for permitting said locking pin carried by said lever to be withdrawn from said aperture and rotated about a horizontal axis with respect to said rail-like member into its inoperative position so that said rail-like member may be detached from the structural members of the freight car.

5. A freight loading apparatus for freight hauling vehicles having spaced apart vertically extending structural posts, with each of said posts having formed therein a vertically extending double row of horizontally aligned openings, a longitudinally extending rail member horizontally disposed between and adjustably attachable to successive spaced apart structural posts, means provided by said rail member adjacent each end thereof for selectively engaging each of said successive spaced apart posts for adjustably supporting said rail member thereto, said means comprising a plurality of pins projecting laterally from said rail member for insertion into a selected plurality of the openings formed in said posts, one of said pins being yieldably carried by said rail member and normally out of alignment with its selected respective openings formed in said post when the other of said pins are inserted in their respective selected openings, said yieldable pin being positionable in complete registration with its selected opening upon limited parallel movement in one direction of said rail member relative to said post after said other of said pins have been inserted in their selected openings formed in said post so as to detachably connect said rail member to said post.

6. A freight loading apparatus for freight hauling vehicles having spaced apart vertically extending structural posts, with each of said posts having formed therein a vertically extending double row of horizontally aligned openings, a longitudinally extending rail member horizontally disposed between and adjustably attachable to successive spaced apart structural posts, means provided by said rail member adjacent each end thereof for selectively engaging each of said successive spaced apart posts for adjustably supporting said rail member thereto, said means comprising a plurality of pins projecting laterally from said rail member for insertion into a selected plurality of the openings formed in said posts, certain of said pins being so registrable with respect to their selected openings formed in said posts so as to permit limited parallel movement of said rail member relative to said posts after said certain of said pins are inserted in their selected openings, one of said pins being yieldably carried by said rail member and normally out of alignment with its selected respective opening formed in said posts when the other of said pins are inserted in their respective selected openings, said yieldable pin being positionable in complete registration with its selected opening upon limited parallel movement in one direction of said rail member relative to said posts after said other of said pins have been inserted in their selected openings formed in said posts so as to detachably connect said rail member to said posts.

7. A freight loading apparatus for freight hauling vehicles having spaced apart vertically extending structural posts, with each of said posts having formed therein a vertically extending double row of horizontally aligned openings, a longitudinally extending rail member horizontally disposed between and adjustably attachable to successive spaced apart structural posts, means provided by said rail member adjacent each end thereof for selectively engaging each of said successive spaced apart posts for adjustably supporting said rail member thereto, said means comprising a plurality if pins projecting laterally from said rail member for insertion into a selected plurality of the openings formed in said posts, one of said pins being yieldably carried by said rail member and normally out of alignment with its selected respective openings formed in said post when the other of said pins are inserted in their respective selected openings, means for yieldably connecting said one of said pins to said rail member, said yieldable pin being positionable in complete registration with its selected opening upon limited parallel movement in one direction of said rail member relative to said posts after said other of said pins have been inserted in their selected openings formed in said posts so as to detachably connect said rail member to said posts.

8. A freight loading apparatus for freight hauling vehicles having spaced apart vertically extending structural posts, with each of said posts having formed therein a vertically extending double row of horizontally aligned openings, a longitudinally extending rail member horizontally disposed between and adjustably attachable to successive spaced apart structural posts, means provided by said rail member adjacent each end thereof for selectively engaging each of said successive spaced apart posts for adjustably supporting said rail member thereto, said means comprising a plurality of pins projecting laterally from said rail member for insertion into a selected plurality of the openings formed in said posts, certain of said pins being so registrable with respect to their selected openings formed in said posts so as to permit limited parallel movement of said rail member relative to said posts after said certain of said pins are inserted in their selected openings, one of said pins being yieldably carried by said rail member and normally out of alignment with its selected respective opening formed in said posts when the other of said pins are inserted in their respective selected openings, means for yieldably connecting said one of said pins to said rail member, said yieldable pin being positionable in complete registration with its selected opening upon limited parallel movement in one direction of said rail member relative to said posts after said other of said pins have been inserted in their selected openings formed in said posts so as to detachably connect said rail member to said posts.

9. A freight loading apparatus for freight hauling vehicles having spaced apart vertically extending structural posts with each of said posts having formed therein adjacent opposite longitudinal edges thereof a row of vertically extending horizontally aligned openings, a longitudinally extending rail member horizontally disposed between and adjustably attachable to successive spaced apart structural posts, means provided by said rail member adjacent each end thereof for selectively engaging each of the successive spaced apart posts for adjustably supporting said rail member thereto, said means comprising a plurality of laterally projecting members for insertion into selected openings formed in said posts, said laterally projecting members being spaced with respect to each other so as to be registrable with respect to selected openings so as to permit limited parallel movement of said rail member relative to said posts, a latch lever pivotally and rotatably carried by said rail member, locking means carried at one end of said lever and being projectable in said rail member for insertion into a selected opening formed in said posts, said locking means being normally out of alignment with its selected opening when said laterally projecting members are inserted in their respective openings, said locking means being positionable in complete registration with its selected opening upon limited parallel movement in one direction of said rail member relative to said posts after said laterally projecting members have been inserted in their selected openings so as to detachably connect said rail member between successive posts.

10. A freight loading apparatus for freight hauling vehicles having spaced apart vertically extending structural posts with each of said posts having formed therein adjacent opposite longitudinal edges thereof a row of vertically extending horizontally aligned openings, a longitudinally extending rail member horizontally disposed between and adjustably attachable to successive spaced apart structural posts, means provided by said rail member adjacent each end thereof for selectively engaging each of the successive spaced apart posts for adjustably supporting said rail member thereto, said means comprising a plurality of laterally projecting members for insertion into selected openings formed in said posts, said laterally projecting members being spaced with respect to each other so as to be registrable with respect to selected openings so as to permit limited parallel movement of said rail member relative to said posts, a latch lever pivotally and rotatably carried by said rail member, said latch lever providing a locking pin being projectably through an aperture formed in said rail member for insertion into a selected opening formed in said posts, said locking pin being normally out of alignment with its selected opening when said laterally projecting members are inserted in their respective openings, said latching pin being positionable in complete registration with its selected opening upon limited parallel movement in one direction of said rail member relative to said posts after said laterally projecting members have been inserted in their selected openings so as to detachably connect said rail member between successive posts.

References Cited in the file of this patent

UNITED STATES PATENTS

| | | |
|---|---|---|
| 1,473,817 | Gorsline | Nov. 13, 1923 |
| 2,679,214 | Nampa | May 25, 1954 |